C. DURANT.
Improvement in Drip-Pipe Trap for Refrigerators.
No. 132,391.  Patented Oct. 22, 1872.
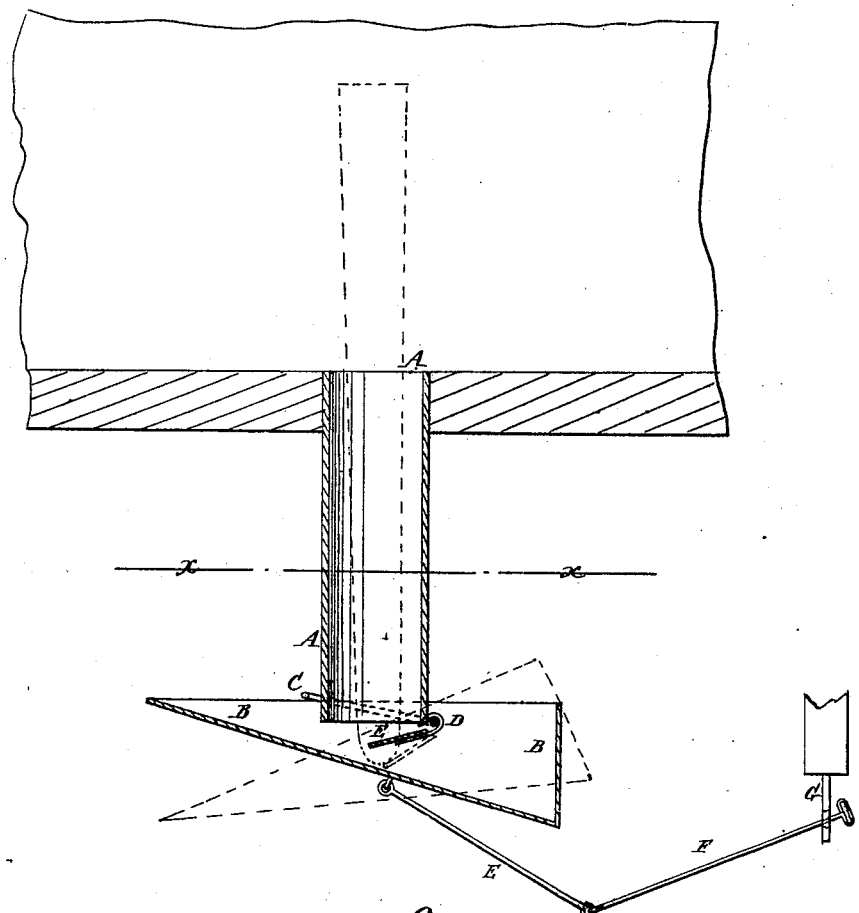
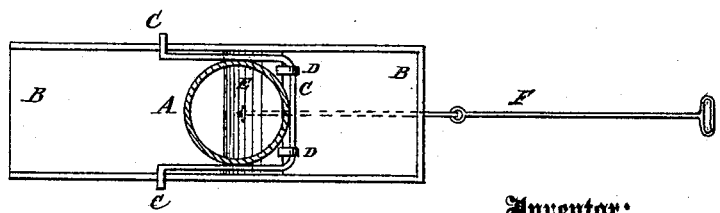

UNITED STATES PATENT OFFICE.

CHARLES DURANT, OF JERSEY CITY, NEW JERSEY.

IMPROVEMENT IN DRIP-PIPE TRAPS FOR REFRIGERATORS.

Specification forming part of Letters Patent No. 132,391, dated October 22, 1872.

*To all whom it may concern:*

Be it known that I, CHARLES DURANT, of Jersey City, in the county of Hudson and State of New Jersey, have invented a new and useful Improvement in Drip-Pipe Trap for Refrigerators, of which the following is a specification:

In the accompanying drawing, Figure 1 is a detail vertical section of my improved drip-pipe trap shown as applied to a drip-pipe, and Fig. 2 is a top view of the same, the drip-pipe being shown in section through the lines $x\,x$, Fig. 1.

Similar letters of reference indicate corresponding parts.

My invention has for its object to furnish an improved trap for the drip or drain-pipe of a refrigerator, which shall be so constructed that it may be tilted to clear it of any sediment or other matter that may collect in it, and unless removed obstruct it; and it consists in the combination of a tilting-trap with the drain-pipe; in the construction of the trap; in the combination, with the drain-pipe, of a U-shaped supporting and stop bar; in the combination with the trap of a cross-bar or plate; in the combination of a trip-rod with the tilting-trap; and in the combination of hook-hinges with the trap and its supporting-bar, as hereinafter more fully described.

A represents the drip or drain pipe of a refrigerator, about the construction of which there is nothing new. B is the drip-pipe trap, which is made wedge-shaped, and is suspended beneath the drip-pipe A in such a way that the water in said trap may seal the mouth of the drain-pipe and prevent the passage of air from and into the refrigerator through said pipe. The trap B is made of a single piece of sheet metal, bent at right angles to form the vertical sides and end, the only joints or seams being the vertical corners at the vertical end of the trap. To the lower end of the drip-pipe A, in a horizontal position or nearly so, is attached a U-shaped bar or wire, C, the bend of which projects at one side of said drip-pipe and the ends at the other side, said ends being bent outward for the upper edges of the trap to strike against and thus serve as a stop to said trap. To the sides of the trap B, or to a cross-bar or plate attached to said sides, are attached two hooks, D, which hook upon the bend of the bar or wire C and thus suspend the trap B from and hinge it to said bar or wire. The trap B is suspended a little out of its center of gravity so that its own weight will hold it in position. The trap B may, if desired, be suspended by a spring, which will bring it into position again after being tilted. E is a bar or plate, the ends of which are attached to the sides of the trap B in such a position that the said plate or bar may be directly beneath the drip-pipe A. The bar or plate E may be inclined a little toward the mouth of the trap B, as shown in Figs. 1 and 2.

When it is desired to tilt the trap to clean out the sediment, a stick or rod may be inserted in the drip-pipe from its upper end, so that the lower end of said stick may rest upon the plate or bar E, which will depress the mouth of the trap and allow the water and sediment to flow out. As the stick or rod is withdrawn the trap will return to its proper position.

The plate or bar E is especially designed to prevent the end of the rod or stick from slipping down to or past the hinges and being thus unable to tilt the trap. The hook-hinges D allow the trap to be conveniently detached when desired for thoroughly cleaning it.

In case the upper end of the drip-pipe A be covered with ice, or is inaccessible from any other cause, the trip-rod F may be used. The forward end of the rod F is pivoted to the trap B forward of its point of support, and its rear end passes through a guide or keeper, G, attached to the lower part of the refrigerator or some other suitable support. The rod F should have a joint or stop formed upon it, or a stop attached to it in such a position as to strike against the guide G and stop the rod F before the raised end of the trap B strikes the drip-pipe A, which would otherwise form a fulcrum or point of resistance, and produce a leverage that might cause the breakage of some part of the device.

Having thus described my invention, I claim as new, and desire to secure by Letters Patent—

1. The combination of the tilting-trap B or its equivalent with the drain-pipe A, substantially as herein shown and described.

2. A tilting-trap B, made in one piece of metal, substantially as described.

3. The combination, with the drain-pipe A, of the U-shaped bar or wire C, substantially as shown and described, so that said bar or wire C will form both a stop and a support for the tilting-trap.

4. The combination, with the tilting-trap B, of the cross-bar or plate E for the purpose of assisting in tilting the trap, substantially as described.

5. The combination of the trip-rod F or its equivalent with the tilting-trap B, substantially as and for the purpose described.

6. The combination of the hook-hinges D with the trap B and its supporting-bar C, substantially as described.

CHARLES DURANT.

Witnesses:
JAMES T. GRAHAM,
ALEX. F. ROBERTS.